Oct. 26, 1948.

C. W. KINZER 2,452,059

RECORD POSTING APPARATUS

Filed Sept. 6, 1944

Inventor

Charles W. Kinzer

By

Attorneys

Oct. 26, 1948.  C. W. KINZER  2,452,059
RECORD POSTING APPARATUS
Filed Sept. 6, 1944  7 Sheets-Sheet 4

Inventor
Charles W. Kinzer
By
Attorneys

Oct. 26, 1948.　　　　C. W. KINZER　　　　2,452,059
RECORD POSTING APPARATUS
Filed Sept. 6, 1944　　　　　　　　　　　　　7 Sheets-Sheet 5

Inventor
Charles W. Kinzer
By
Attorneys

Oct. 26, 1948.  C. W. KINZER  2,452,059
RECORD POSTING APPARATUS
Filed Sept. 6, 1944  7 Sheets-Sheet 6

Inventor
Charles W. Kinzer
By
Attorneys

Oct. 26, 1948.    C. W. KINZER    2,452,059
RECORD POSTING APPARATUS
Filed Sept. 6, 1944    7 Sheets-Sheet 7

Patented Oct. 26, 1948

2,452,059

UNITED STATES PATENT OFFICE 2,452,059

RECORD POSTING APPARATUS

Charles W. Kinzer, Greenbelt, Md.

Application September 6, 1944, Serial No. 552,853

6 Claims. (Cl. 216—28)

(Granted under the act of March 3, 1883, as amended April 30, 1928; 370 O. G. 757)

The invention described herein may be manufactured and used by or for the Government for governmental purposes, without payment to me of any royalty thereon.

This invention relates generally to a posting apparatus but more particularly to a device for cutting strips from a transaction record or journal sheet showing one or more transactions on the same day and attaching the same to a history or ledger card.

One object of the invention is to provide an easily operated, efficient, and durable apparatus for posting records.

Another object of the invention is to provide an apparatus of the class described adapted to cut strips of printed or handwritten matter from one sheet and neatly attach the same in even alignment upon another sheet.

Another object of the invention is to provide a device of the class described which may be easily operated by a novice, and a device in which the control mechanism is arranged so that only a single operator is required to post items rapidly and neatly.

With these and other objects in view the invention consists in certain features of construction and operation of parts which will hereinafter be described and shown in the accompanying drawings in which.

Briefly stated, the device which forms the subject matter of this invention is designed to provide a means for posting ledger or classified accounts from journal records or listings (original entries) without resorting to hand posting or transfer (spirit) posting.

Figure 17:
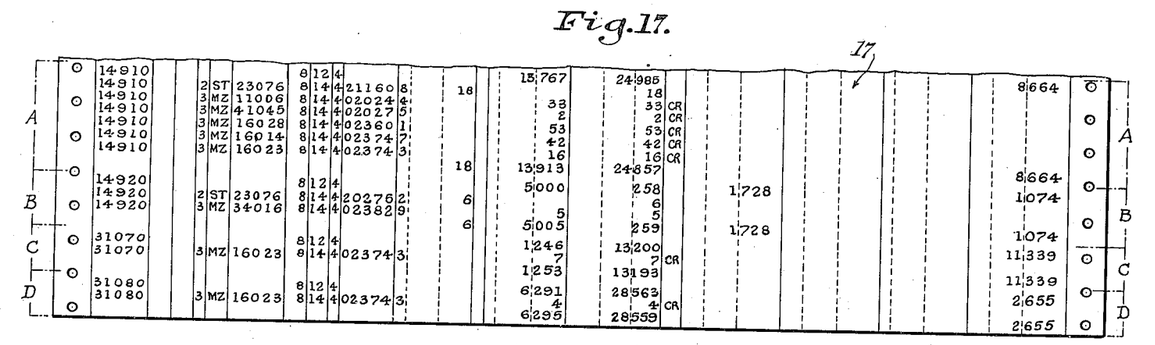
Figure 17 shows a section of a perforated daily transaction register sheet.
Figure 18:
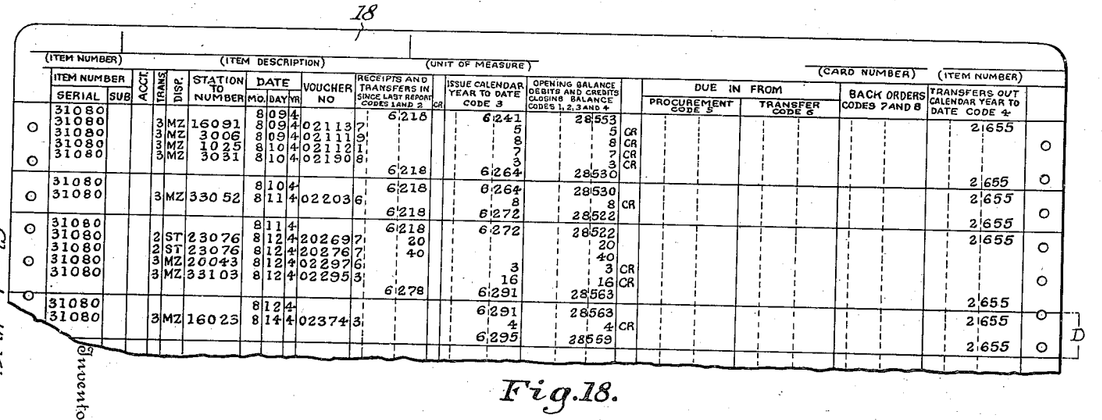
Figure 18 represents a portion of a stock record card showing previous postings of item 31080 plus the current posting of the same item from the transaction register indicated by D in Fig. 17.
Figure 19:
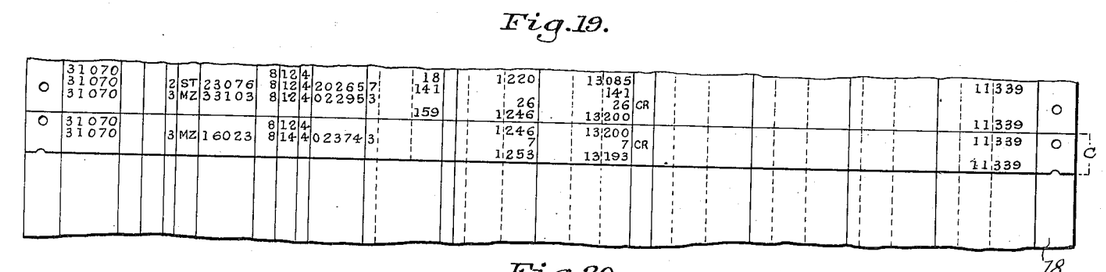
Figure 19 represents a portion of a second record card showing previous postings of item 31070 of the register sheet plus the current posting of the same item as indicated by C in Fig. 17.
Figure 20:
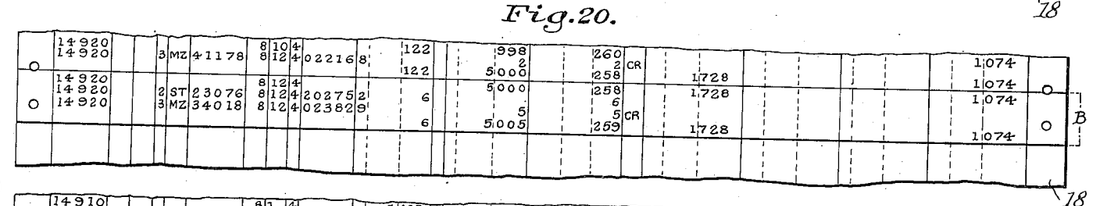
Figure 20 shows a portion of a third record card to which item B of the register sheet, shown in Fig. 17, has been adhesively connected.
Figure 21:
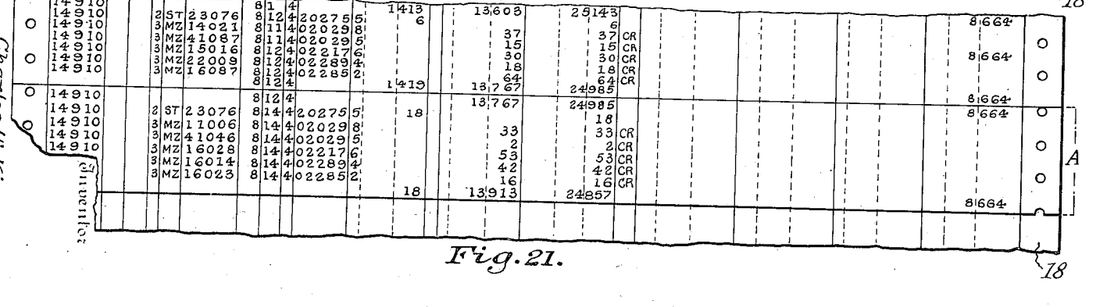
Figure 21 shows a portion of a fourth record card to which the item A of the register sheet, shown in Fig. 17, has been connected.

A journal listing of supply items, as produced on electric accounting machines by a commercial concern or by the Medical Department of the Army or some other Government office, is shown in Fig. 17. All of the transactions in connection with each item are grouped immediately after the balance for the previous day on this listing. They are followed by the new balances for the day of the listing.

The present method of maintaining stock ledger cards is to transfer each line of a day's transactions on an item, including the opening and closing balance, one line at a time, to a ledger card by the spirit or the hectograph direct process.

The same result can be attained by severing the daily listing between groups of transactions, and posting the resultant strips to the ledger cards as shown in Figs. 17 to 21 inclusive, and in which the items indicated by the letters D, C, B and A are cut from the register sheet, shown in Fig. 17, and posted on the record cards shown in Figs. 18, 19, 20 and 21, respectively, as will be further described. To accomplish this manually would consume considerable time and the product would not be neat and uniform in appearance. Therefore a mechanism to accomplish this speedily and uniformly was designed, as described below.

Figures 1, 13:
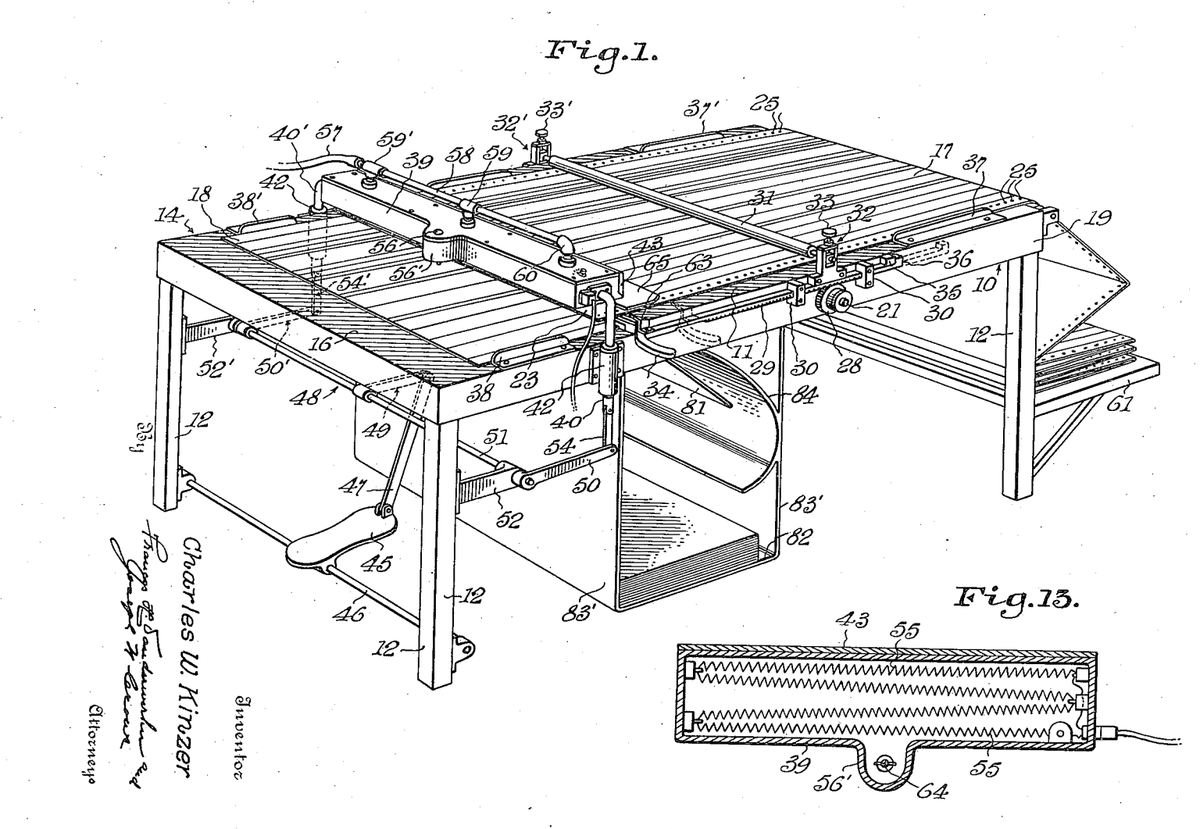
Figure 1 is a perspective view of the assembled apparatus, showing the transaction record and the stock record sheets in position for posting.
Figure 13 is a longitudinal cross section view of the presser member showing the arrangement of the heating coils therein.
Figure 4:
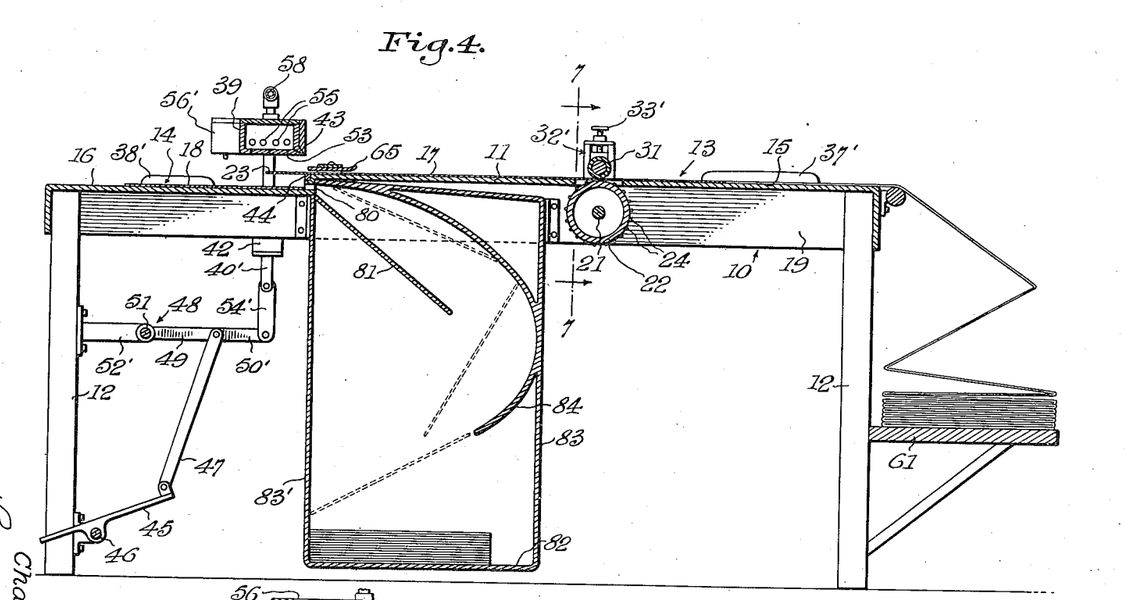
Figure 4 is a sectionized side elevation of the device, the section being taken on the line 4—4 of Fig. 2.
Figure 5:
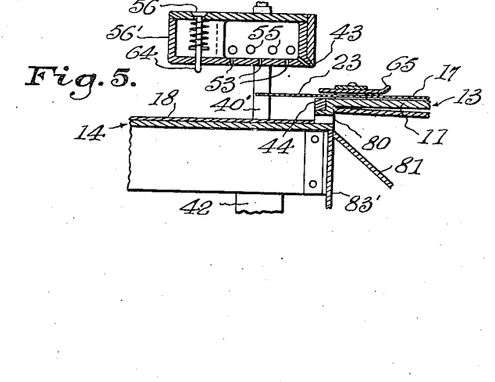
Figure 5 is an enlarged view of a portion of the sectionized elevation illustrated in Fig. 4, showing the presser member of the transferring mechanism in elevated position.
Figure 6:
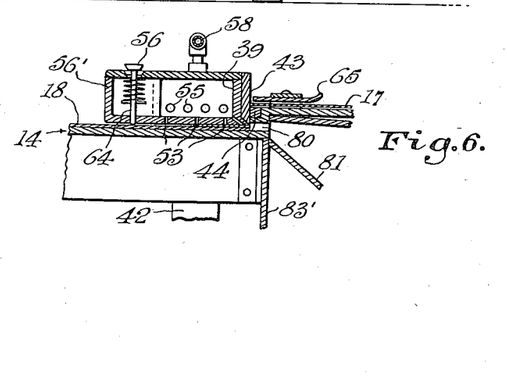
Figure 6 is a similar view to that shown in Fig. 5, with the presser member shown in lowered position.
Figure 7:
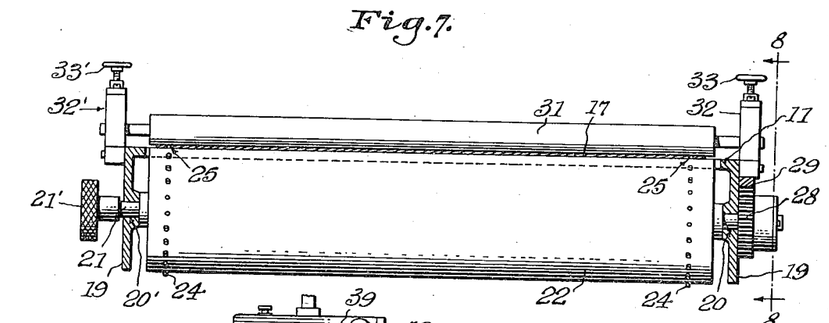
Figure 7 is a partially sectionized view taken on the line 7—7 of Fig. 4, showing the spacing and aligning rollers, the shaft bearings therefor, and the rack pinion.
Figure 8:
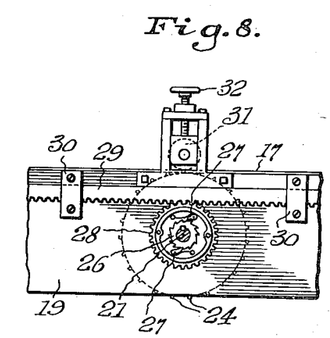
Figure 8 is a partially sectionized elevation taken on the line 8—8 of Fig. 7 showing the spacing mechanism within the rack pinion.
Figures 9, 10, 11:
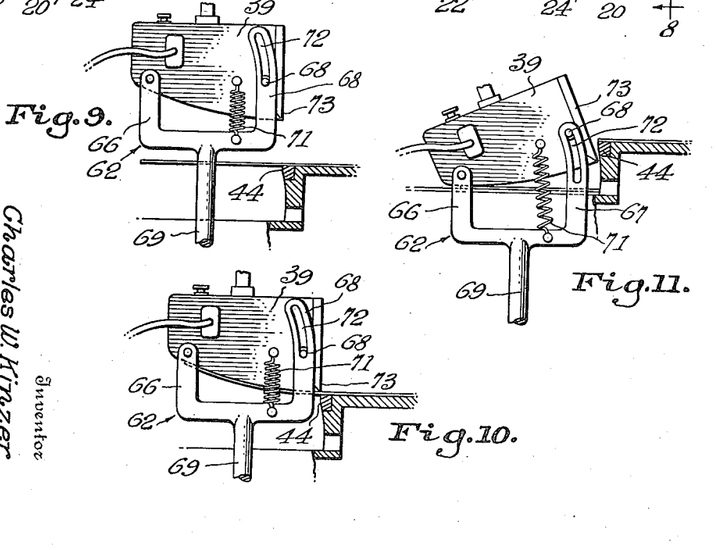
Figure 9 is a side elevation illustrating a modified form of presser member of the transferring mechanism, showing said member in elevated position.
Figure 10 is a side elevation illustrating the modified form of presser member showing the same lowered partially into cutting position.
Figure 11 is a side elevation of the presser member shown in Figs. 9 and 10, with the member in lowered position and at the end of its rolling action.
Figure 12:
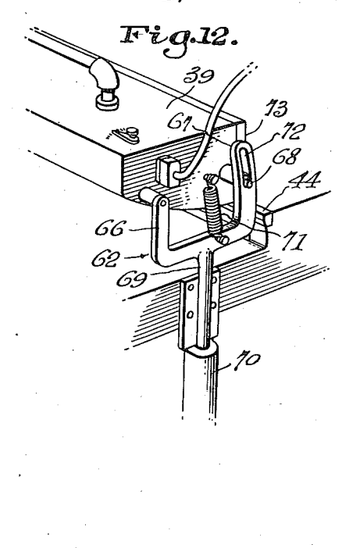
Figure 12 is a perspective view showing one end of the modified form of transferring mechanism.

Referring to Fig. 1 of the drawings, the numeral 10 indicates a table comprising a platform or top 11 supported by legs 12. The table is preferably made of metal and the top 11 may consist of either a pressed out or cast member as shown in Fig. 4. The table top 11 is divided into a forward and a rear section or plates, designated respectively by the numerals 13 and 14, having upper plate surfaces 15 and 16. The plate surface 15 of the rear section is raised slightly above the plate surface 16 of the forward section so that the daily transaction register sheet 17 when placed thereon may be passed from the higher surface so as to project above the stock record card 18 located on the upper surface 16 of the rear plate as will be further explained.

The downwardly projecting edges 19 of the top 11, within the rear section thereof are provided with drilled openings 20 and 20' which serve as bearings for the shaft 21 of the spacing roller 22 which is adapted to advance a register sheet 17 or any other data sheet from which it is desired to post information. The spacing roller 22 which is keyed or otherwise rigidly connected to the shaft 21 is provided with pins 24 adjacent either end thereof, which are adapted to engage the perforations 25 in the edges of the register sheets 17. A ratchet wheel 26 is also keyed to the roller shaft 21. This ratchet is engaged by pawls 27 which are pivotally connected to a pinion 28 rotatably mounted on the shaft 21 and engaged by the teeth of a manually operated rack 29 which is slidably connected to the side of the table by the bearing blocks 30. By making the teeth of the rack 27 and the pinion 28 just the right size the machine can be made to feed a line at a time.

Above the spacing roller 22 is located a pressure roller 31. The roller 31 is rotatably mounted in pedestal pressure bearings 32 and 32' which are provided with adjusting screws 33 and 33' for increasing or decreasing the pressure or clearance between the pressure roller and the spacing roller to thus control the pressure on the daily transaction register which is moved between them when the rack, which is provided with a handle 34, is moved forward. The extent of movement of the rack is limited by means of the stop block 35 which projects from the side of the table and engages the upturned end 36 of the rack after the advance roller which engages the perforated sides of the register sheet has moved said sheet forward a predetermined distance.

Upon both the forward and rear supporting plates 15 and 16 are attached guide members 37, 37' and 38, 38'. These guide members which are formed from angle strips are attached to the top of the plates adjacent the lateral edges thereof and serve to retain the record sheets or cards in alignment so that a strip 23 may be cut off from the projecting end of a register sheet 17 so that it will be pressed evenly and straight across the record card by the posting mechanism as will be further described.

The pasting and cutting, or posting mechanism comprises a heater housing 39 of rectangular cross sections which extends transversely across the lower plate surface 16 of the top 11. The housing 39 is supported by downwardly extending rods 40 and 40' attached to the ends thereof. These downwardly extending rods or pistons are each connected to a helical spring 41 which is supported within a cylinder 42 attached to the sides of the table. The springs 41 retain the posting mechanism in an elevated position above the table, with the cutting blade 43, which is attached to one side thereof, positioned just above blade edge 44 which is attached to the forward end of the elevated portion of the top 11. The housing or casing 39 is moved downwardly against the action of the springs 41 and by means of a treadle 45 which is pivotally mounted on a bar 46 attached to the forward legs of the table. The treadle 45 is connected by a link 47 to a bell crank lever 48 comprising lever arms 49, 50, and 50', which are fastened to a shaft 51 pivotally mounted in the brackets 52 and 52' attached to the forward legs 12 of the table. The arms 50 and 50' are connected by links 54 and 54' to the rods 40 and 40' so that when the treadle 45 is pressed downward the posting mechanism is moved downward. The housing 39 of the posting mechanism is provided with a bottom plate having minute openings 53 therein. Within the housing is located a heating coil 55, and to the exterior of its forward side is attached a cutting blade 43. The interior of the housing 39 is connected through a tube 57 with a vacuum creating apparatus, not shown, in order to retain a strip cut from the daily transaction register sheet to the bottom of said housing until it is pressed against the top surface of the stock record card for adhesive attachment thereto, at which time the suction is released by the opening of a spring closed valve 56 within a lateral extension 56' of the housing 39, which communicates with the interior of said housing. The valve stem projects thru an opening in the bottom of the extended portion of the housing 39, so that when the housing is lowered to within a short distance of the surface of the rear section 14 of the table top 11, the valve is raised and the partial vacuum within the housing is decreased. The vacuum release mechanism shown represents one of a number of suitable mechanisms which may be used for this purpose.

The tube 57 which is flexible, is connected to rigid tube 58 which extends longitudinally across the top of the housing. The tube 58 is connected to the housing by the two tubular T members 59 and 59' and the elbow 60. The openings in the bottom of the housing are so minute that a low pressure is retained therein sufficient to hold narrow strips of paper against the surface although most of the openings may remain uncovered.

In the operation of the device the transaction register sheets which are folded as shown in Fig. 1, are placed upon the shelf 61 at the rear of the table. The upper folds of the sheets are lifted from the stack and extended across the top of the table between the guide members 37 and 37'. The forward end of a sheet is then fed between the rollers 31 and 22. The pins or teeth 24 of the roller 22 engaged the perforations along the sides of the sheet, and when the handle 34 of the rack 29 is moved forward the roller 22 moves the sheet forward as far as desired by the operator. When starting, the sheet is brought forward by turning the handwheel 21' until the edge coincides with the knife blade. The operator then reads the listing to determine the items he desires to post. In order that the operator may bring the sheet forward to the exact place where he desires it to be cut, so that the strip cut off will contain the desired number of items, a pointer 63 is placed upon the end of the rack adjacent the handle and the other end of the rack is provided with an upwardly projecting portion 36 which contacts a stop member 35, projecting from the side of the table, when the pointer is directly over the outer edge of the shearing member 44. With this construction it is only necessary to set the pointer at the place on the daily transaction register sheet where it is desired to cut a strip containing the items required, and then move the handle forward until the rack 29 is stopped by the stop member or block 35 so that the place where it is desired to cut the register sheet will be directly under the knife blade. The register sheet is retained in close contact with the supporting surface by means of a guide member 65 which is attached to one side of the table and extends across the sheet adjacent its forward end.

When the strip from the daily transfer register containing the number of items it is desired to transfer to a stock record card has been severed, it adheres to the bottom of the housing of the posting mechanism due to the vacuum created therein. The treadle 45 is then moved further downward by the operator, the housing lowered and the strip pressed onto the stock record card as the vacuum is simultaneously released by pressure on the end of the valve stem 64. The pressure of the housing in conjunction with heat emitted therefrom causes the thermo-adhesive coating on the reverse side of the register strip to adhere to the stock record card. To raise the housing from the record card it is only necessary to release pressure on the treadle, as the springs 41 elevate the housing to its original position.

To cut another strip from the daily register sheet the handle 34 is pushed forward until the pointer 63 is moved to the place where it is desired to make the cut. It will be noted that when moving the handle forward or away from the operator, the advance roller does not turn as the pawls 27 of the pinion 28 ride over the ratchet 21 on the roller shaft when the pinion is turned in a clockwise direction.

In a modified form of the device as shown in Figs. 9 to 12, inclusive, the housing of the posting mechanism is formed with a curved bottom surface. The forward portion of the housing is pivotally mounted between the forward arms 66 of the yokes 62 (only one of which is shown) and the rear portion of the housing is provided with projecting pins 68 which engage arcuate slots in the rear arms 67 of the yokes. The yokes are formed integral with the downwardly extending rods or pistons 69 which are mounted in the cylinders 70 in the same manner as the rods or pistons 40 and 40'. A spring 71 connecting the forward portion of the housing with the yoke retains the pin 68 at the bottom of the slot 72 when the housing is in elevated position. When the housing is lowered, the blade 73 cuts a strip from the daily transfer register sheet and moves it downward in contact with its lower curved surface due to the vacuum created therein until the forward portion thereof contacts the upper surface of the stock record card to which it adheres due to the thermo-adhesive coating on its lower surface which is rendered active by the heat emitted from the housing and the pressure thereof. As the yokes are moved downward after the contact of the forward portion of the housing, a rolling motion is effected which applies the strip smoothly to the surface of the record card as illustrated in the Figs. 9, 10 and 11.

Figures 14, 15:
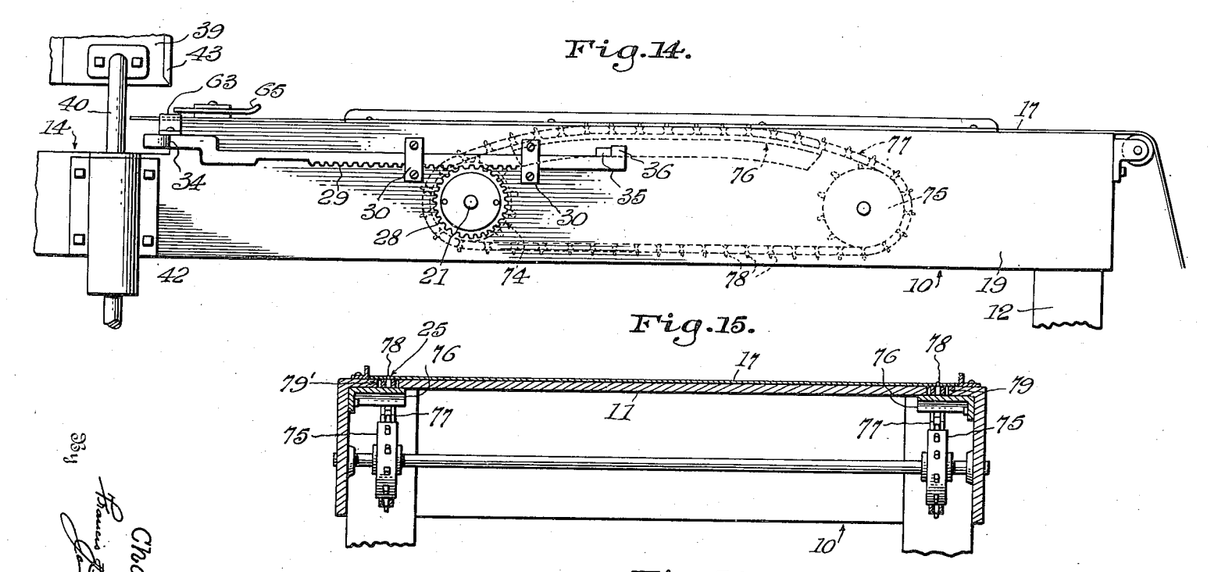
Figure 14 is a side elevation of a portion of the apparatus showing a modified form of the register advance mechanism.
Figure 15 is a transverse partially sectionized view showing the arrangement of the chain sprockets on the modified register advance mechanism shown in Fig. 14.
Figure 16:
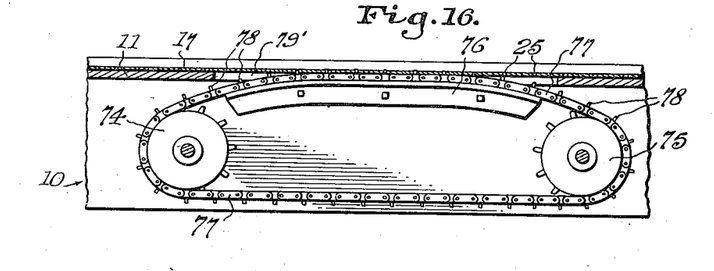
Figure 16 is a side elevation of the modified form of register advance mechanism, showing the toothed track in engagement with a perforated record.

Figs. 14, 15 and 16 illustrate another modified form of the device in which a track is substituted for the toothed roller 22 shown in Figs. 4 to 7, inclusive.

Figures 2, 3:
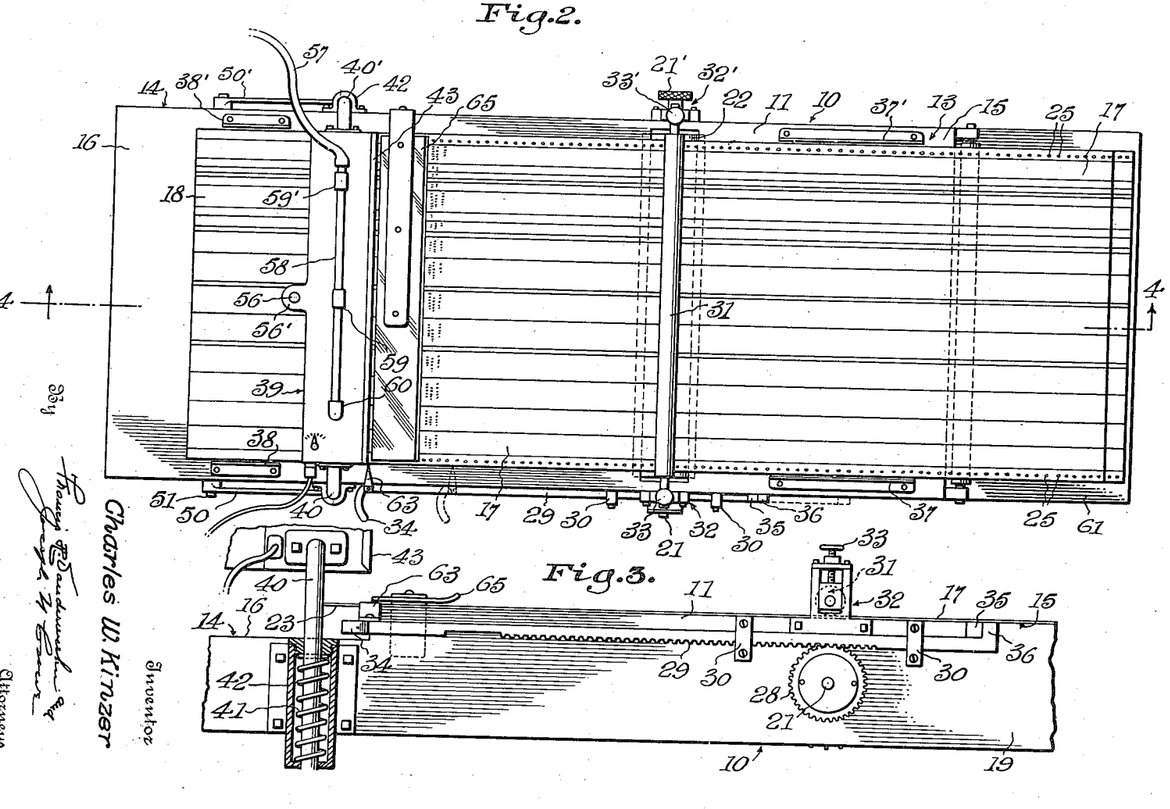
Figure 2 is a top plan view of the apparatus shown in Fig. 1.
Figure 3 is a side elevation of a portion of the device showing the transaction record advance mechanism and a portion of the transferring mechanism partially sectionized.

The track is supported by the toothed driving wheel 74, toothed idler wheels 75 and the angular guide members 76. The remainder of the advance or spacing mechanism is the same as that shown in Figs. 1, 2 and 3. In this construction the tracks 77 are provided with teeth or pins 78 which engage the perforations adjacent the lateral edges of the transfer register sheet through the slotted openings 79, 79' in the supporting surface 15.

After a sufficient number of strips from the register sheet have been posted on the record card, the card is pushed forward through the slot 80 between the adjacent ends of the forward and rear supporting plates over an inclined plate 81 onto a shelf 82 which is suspended from the table by the forward and rear walls 83 and 83'. Upon the forward wall 83 is attached a curved deflection plate 84 which turns the record card over as it falls from the slot 80 and the cards are stacked on the shelf 82 with their printed sides down.

Although the apparatus has been described relative to bookkeeping or accounting work it may be used in any field where it is required to post items which may be cut from data sheets.

Having thus described my invention, what I claim as new and wish to secure by Letters Patent is:

1. A posting apparatus of the class described comprising a supporting table provided with forward and rear vertically spaced top members having longitudinal guides mounted thereon adjacent to their lateral edges, said upper top member being provided with a transverse slot, an adjustable pressure roller and a register sheet advance roller rotatably mounted on said table respectively above and below said upper top member and adjacent and parallel to said slot, a posting mechanism comprising a heated presser housing provided with a bottom plate containing minute openings therein, means comprising springs for normally retaining said housing in an elevated position, a cutting blade attached to said housing, treadle operated means connected to said housing adapted to lower the same against the action of said springs and additional pressure operated means in connection with said housing adapted to admit air to the interior thereof upon lowering of the same against the action of said springs.

2. A posting apparatus of the class described comprising a supporting table provided with forward and rear vertically offset supporting plates adapted to support respectively a register sheet provided on its lower surface with a thermo-adhesive coating and a record card, said upper supporting plate being provided with a centrally located transverse slot and having a shearing strip located at its forward edge, a spacing mechanism attached to said upper supporting plate adjacent said slot and adapted to advance said register sheet variable selected distances beyond the edge of said shearing strip to project above said record card, a posting mechanism including a vertically reciprocated presser member, having a shearing edge adapted to sever the projecting portion of said register sheet, a heating unit for rendering the thermo-adhesive coating effective, vacuum operated means for lowering the severed portion of said register sheet upon said record card, and means in connection with said vacuum operated means for releasing said register sheet when it has been brought into contact with said record card and simultaneously pressed into adhesion therewith by said presser member.

3. A posting apparatus of the class described comprising a supporting table provided with forward and rear vertically offset supporting plates adapted to support respectively a register sheet provided on its lower surface with a thermo-adhesive coating and a record card, said upper supporting plate being provided with a centrally located transverse slot and a shearing strip located at its forward edge, a spacing mechanism comprising a spacing roller and a presser roller rotatably mounted on said upper supporting plate adjacent said slot and adapted to advance said register sheet a variable selected distance beyond the edge of said shearing strip to project above said record card, a posting mechanism including a vertically reciprocated presser member comprising a housing having a perforated presser plate and means connecting the interior of said housing with a vacuum creating apparatus, a cutting blade connected to said housing adapted to sever the projecting portion of said register sheet, a heating unit in connection with said housing adapted to render said thermo-adhesive coating effective, and a release valve connected to said housing and operated by the reciprocating movement thereof, whereby with the downward movement of said housing the projecting portion of said register sheet is severed, and the severed portion retained in contact with said perforated presser plate as it is lowered to the surface of said record card where it is pressed into adhesive contact therewith and released from contact with the perforated presser plate.

4. A posting apparatus of the class described comprising a supporting table provided with forward and rear vertically offset supporting plates adapted to support respectively a register sheet provided on its lower surface with a thermo-adhesive coating and a record card, said upper supporting plate being provided with a centrally located transverse slot and a shearing strip located at its forward edge, a spacing mechanism comprising a spacing roller and a presser roller rotatably mounted on said upper supporting plate adjacent said slot, a ratchet and rack operating mechanism in connection with said spacing roller and adapted to advance said register sheet a variable selected distance beyond the edge of said shearing strip to project above said record card, and a posting mechanism including simultaneously operated means comprising a vertically movable presser member including a housing having a perforated lower surface, a cutting blade connected to said housing, a heating coil mounted within said housing, and means connecting the interior of said housing with a vacuum creating apparatus, and an automatically operated release valve, whereby the downward movement of said housing the projecting portion of the register sheet is severed and the severed portion retained in contact with said perforated presser plate as it is lowered to the surface of the record card where it is pressed into adhesive contact therewith and released from contact with the perforated presser plate.

5. A posting apparatus of the class described comprising a supporting table provided with forward and rear vertically offset supporting plates adapted to support respectively a register sheet provided on its lower surface with a thermo-adhesive coating and a record card, said upper supporting plate being provided with a centrally located transverse slot and a shearing strip located at its forward edge, a spacing mechanism comprising a spacing roller and a presser roller rotatably mounted on said upper supporting plate adjacent said slot said spacing roller being adapted to advance said register sheet a variable selected distance beyond the edge of said shearing strip to project above said record card, a posting mechanism including simultaneously operated means comprising a vertically movable presser member including a suction chamber having a perforated lower surface, means for connecting said suction chamber to a vacuum creating apparatus a valve chamber communicating with said suction chamber, a vacuum release valve mounted within said valve chamber, pressure operated releasing means for releasing said valve, a heating coil mounted within said suction chamber, a cutting blade connected to said pressure member and a treadle operated means for lowering said presser member to thereby sever a strip from said register sheet and convey the same in contact with the lower surface of said pressure member until released by said vacuum release valve as its pressure operated releasing means contacts the upper surface of said record card and by the combined action of heat and pressure effects the adherence of its lower thermo-adhesive surface thereto.

6. A posting apparatus of the class described comprising a supporting table provided with forward and rear vertically spaced top members having longitudinal guides mounted thereon adjacent to their lateral edges and adapted to support respectively a register sheet provided with a thermo-adhesive coating and a record card, said forward top member being provided with a transverse slot, an adjustable pressure roller and an advance roller rotatably mounted on said table respectively above and below said forward top member and adjacent and parallel to said slot, means in connection with said advance roller adapted to rotate the same so as to advance said coated sheet a variable, selected distance beyond the forward edge of the rear top member, a posting mechanism comprising a presser element including a spring elevated housing having a perforated bottom surface, means connecting the interior of said housing with a vacuum creating apparatus provided with an automatically operated release valve, a heating coil located within said housing adapted to render said thermo-adhesive coating effective, a shearing blade connected with said housing adapted to sever the projecting portion of said register sheet, and means adapted to lower said housing against the action of said spring to thereby sever said projecting portion of the register sheet and to lower and release same in contact with said record card and adhesively connect it.

CHARLES W. KINZER.

REFERENCES CITED

The following references are of record in the file of this patent:

UNITED STATES PATENTS

| Number | Name | Date |
|---|---|---|
| 986,047 | Cummings | Mar. 7, 1911 |
| 1,323,419 | Strehs | Dec. 2, 1919 |
| 1,981,946 | Collins | Nov. 27, 1934 |
| 2,129,686 | Gray | Sept. 13, 1938 |
| 2,143,800 | Schubert | Jan. 10, 1939 |
| 2,264,339 | Sherman | Dec. 2, 1941 |